US009394117B2

(12) United States Patent
Hanselman

(10) Patent No.: US 9,394,117 B2
(45) Date of Patent: Jul. 19, 2016

(54) GRIPPING ELEMENT SUITABLE FOR USE WITH AN ACCUMULATOR TABLE, ACCUMULATOR TABLE PROVIDED WITH SUCH A GRIPPING ELEMENT AND CONVEYOR SYSTEM COMPRISING SUCH AN ACCUMULATOR TABLE

(71) Applicant: POLYKETTING HOLDING B.V., Zelhem (NL)

(72) Inventor: Marcel Hanselman, Beltrum (NL)

(73) Assignee: POLYKETTING HOLDING B.V., Zelhem (NL)

( * ) Notice: Subject to any disclaimer, the term of this patent is extended or adjusted under 35 U.S.C. 154(b) by 0 days.

(21) Appl. No.: 14/896,500

(22) PCT Filed: Jun. 6, 2014

(86) PCT No.: PCT/NL2014/050368
§ 371 (c)(1),
(2) Date: Dec. 7, 2015

(87) PCT Pub. No.: WO2014/196862
PCT Pub. Date: Dec. 11, 2014

(65) Prior Publication Data
US 2016/0130093 A1 May 12, 2016

(30) Foreign Application Priority Data
Jun. 7, 2013 (NL) ..................................... 2010932

(51) Int. Cl.
*B65G 1/00* (2006.01)
*B65G 47/51* (2006.01)
*B65G 37/00* (2006.01)

(52) U.S. Cl.
CPC .......... *B65G 47/5109* (2013.01); *B65G 37/005* (2013.01)

(58) Field of Classification Search
CPC ........ B65G 1/00; B65G 47/268; B65G 47/53; B65G 47/52; B65G 47/46; B65G 47/841

USPC ............ 198/347.4, 370.1, 457.03, 626.1, 604
See application file for complete search history.

(56) References Cited

U.S. PATENT DOCUMENTS

| 5,501,316 A * | 3/1996 | Hermening | .......... B65G 47/841 |
| | | | 198/457.03 |
| 6,427,097 B1 * | 7/2002 | Martin | .................. B65G 21/10 |
| | | | 198/456 |
| 7,201,369 B2 * | 4/2007 | Blackwell | .............. B65H 9/166 |
| | | | 198/407 |
| 2016/0052726 A1 * | 2/2016 | Steeber | .............. B65G 47/5127 |
| | | | 198/347.4 |

FOREIGN PATENT DOCUMENTS

| EP | 1 232 966 A1 | 8/2002 | |
| JP | 6-48559 | * 2/1984 | ............... B65G 1/00 |
| WO | 2012/082137 A1 | 6/2012 | |

OTHER PUBLICATIONS

International Search Report, dated Aug. 5, 2014, from corresponding PCT Application.

* cited by examiner

*Primary Examiner* — James R Bidwell
(74) *Attorney, Agent, or Firm* — Young & Thompson

(57) ABSTRACT

A gripping element for a transfer arrangement of an accumulator table, including a pair of opposing transfer devices for engaging a product at a gripping location on an infeed conveyor for the transfer devices and for releasing the product, the transfer devices having a driven, endless carrier including gripping elements, driven such that when the drive system is activated the gripping elements are moved by the endless carrier along an endless trajectory, the transfer devices configured for simultaneously moving all gripping elements, and the product engaged thereby, in a transfer direction along a transfer trajectory from the gripping location to a release location, includes a flexible fin for engaging the product, during use substantially extending in a plane aligned with the transfer direction, the fin having such a shape that, when at that gripping location, the transfer direction is substantially parallel to a product support surface of the infeed conveyor.

13 Claims, 3 Drawing Sheets

GRIPPING ELEMENT SUITABLE FOR USE WITH AN ACCUMULATOR TABLE, ACCUMULATOR TABLE PROVIDED WITH SUCH A GRIPPING ELEMENT AND CONVEYOR SYSTEM COMPRISING SUCH AN ACCUMULATOR TABLE

FIELD OF THE INVENTION

The invention relates to a gripping element, suitable for use in a transfer arrangement of an accumulator table, the transfer arrangement comprising a pair of opposing transfer devices for engaging a product at a gripping location on an infeed conveyor for the transfer devices and for releasing the product at a release location, such as on an outfeed conveyor.
   wherein the infeed conveyor is positioned in such a way as to deliver the product to the transfer devices of the accumulator table, wherein the transfer devices are suitable for being provided with an endless carrier comprising a plurality of gripping elements,
   wherein the endless carrier is to be driven by a drive system, in such a way, that when the drive system is activated the gripping elements are moved by the endless carrier along an endless trajectory,
   wherein the transfer devices are configured for simultaneously moving the gripping elements of both transfer devices, and the product engaged thereby, in a transfer direction along a transfer trajectory from the gripping location to the release location, wherein the transfer trajectory essentially forms part of the endless trajectory.

BACKGROUND OF THE INVENTION

Such a gripping element is known. The known gripping element is provided with multiple flexible fins extending in a direction and a plane perpendicular to the transfer direction. When a product is to be gripped or engaged at a gripping location the tins more or less sweep by the product and carry it along until it is firmly clamped between the fins of opposing gripping elements to be transferred along the transfer trajectory.

A disadvantage of the known gripping element is that at the gripping location and during the initial part of the transfer trajectory the product may be dragged along the surface on which it was previously supported. This may damage the product and may lead to an overall decrease of the speed of product transfer.

Another disadvantage of the known gripping element is that at the end of the transfer trajectory, near the release location, the gripping element usually has to be turned around a bend in order to be moved back to the gripping location. At such a bend the radius of curvature generally increases, thereby increasing separation between the consecutive gripping elements and fins, and a sudden acceleration of the gripping element. This may result in the product being hit after release at the release location by one of the fins, causing it to be destabilized and possibly causing it to fall over. As a consequence, this may result in malfunction of the accumulator table or in general the conveyor system of which it is part.

It is an object of the present invention to provide a gripping element with the aforementioned characteristics, that prevents or at least minimizes dragging along of the product over the support surface at the gripping location.

It is a further object of the invention to provide a gripping element with the aforementioned characteristics, that prevents or at least minimizes the chances of the product being destabilized after release at the release location.

SUMMARY OF THE INVENTION

Thereto, the gripping element according to the invention is characterized by
   a flexible fin fir engaging the product, during use substantially extending in a plane aligned with the transfer direction, the plane intersecting the transfer direction,
   the flexible fin having such a shape that, at the gripping location, when, at that gripping location, the transfer direction is substantially parallel to a product support surface of the infeed conveyor, the product is lifted from the support surface, wherein the flexible fin comprises a sloped section that extends at an upward angle with respect to the transfer direction causing the product to be lifted from the support surface.

Due to the flexible fin during use substantially extending in a plane aligned with the transfer direction, preferably a horizontal plane, the plane intersecting the transfer direction, and the flexible fin having such a shape that, at the gripping location, when, at that gripping location, the transfer direction is substantially parallel to a product support surface of the infeed conveyor, the product is lifted from the product support surface, usually a horizontal product support surface, so the product is no longer dragged along over the support surface at the gripping location due to it essentially being displaced in a direction transversal to the transfer direction and the product support surface, which is preferably a direction having an upward directional component to enable product lifting.

The flexible fin therein comprises a sloped section that extends at an upward angle with respect to the transfer direction. Such a sloped section causes the product to be lifted from the support surface in an advantageous manner. The upward angle of the slope depends for instance on the weight of the product to be lifted and the actual lifting distance required to overcome dragging along of the product.

In addition thereto, the orientation of the flexible fin reduces the chances of the product being destabilized after release at the release location, or at least reduces the force with which the product may be hit at the release location.

It is noted that in essence product transfer can take place without the flexible fin having such a shape that, at the gripping location, the product is lifted horn the support surface, as the skilled person will understand, but, as stated, the dragging along of the product over the support surface at the gripping location may cause damage the product and may lead to an overall decrease of the speed of product transfer, if not addressed properly.

In the context of this patent application, the expression 'infeed conveyor' means a conveyor that is capable of transporting or supplying products to the transfer devices, to be gripped thereby. Analogously, 'outfeed conveyor' means a conveyor that is capable of transporting products away from the transfer devices after release at the release location. Consequently, the transfer arrangement can be arranged near the supply side as well as near the discharge side of the accumulator table. Furthermore, in the art the transfer devices are commonly known as 'satellites'.

A further embodiment relates to an aforementioned gripping element, wherein the flexible fin comprises a front section, when seen in the transfer direction, substantially aligned with the transfer direction, and a back section, substantially aligned with the front section, wherein the sloped section is situated between the front and back sections, connecting them to each other. Such front and back sections allow the product to be firmly engaged while being lifted from the support surface by the sloped section that is situated there between. The front and/or back sections may also be placed under an angle with respect to the transfer direction to aid in lifting the product.

A further embodiment relates to an aforementioned gripping element, comprising a row of flexible fins, the row extending in a direction perpendicular to the transfer direction, the flexible fins extending substantially parallel to each other. By having a row of multiple flexible fins the gripping element can be tuned to the specific weight of the product to be supported by these flexible fins. Furthermore, by having multiple fins, mechanical reliability of the gripping element increases. It is also conceivable to place multiple endless carriers on top of each other, such as two, to allow for heavier products to be supported, as well as products having greater height.

Another aspect of the invention concerns an assembly of aforementioned gripping elements, wherein multiple gripping elements are arranged consecutively, with respect to the transfer direction, on the endless carrier, the flexible fins of adjacent gripping elements overlapping at all points on the endless trajectory. By doing so, the undesirable effect of one of the fins hitting the product at the release location and destabilizing it is nearly fully prevented, which offers a significant advantage over the existing gripping element with fins aligned with the plane perpendicular to the transfer direction.

Yet another aspect of the invention relates to an accumulator table for use in a conveyor system, comprising a transfer arrangement, the transfer arrangement comprising a pair of opposing transfer devices for engaging a product at a gripping location on an infeed conveyor for the transfer devices and for releasing the product at a release location, such as on an outfeed conveyor, wherein the infeed conveyor is positioned in such a way as to deliver the product to the transfer devices, wherein the transfer devices are provided with an endless carrier, or are suitable to be provided with such an endless carrier, comprising a plurality of aforementioned consecutive gripping elements or an aforementioned assembly of gripping elements, or are suitable therefor, wherein the endless carrier is to be driven by a drive system, in such a way, that when the drive system is activated the gripping elements are moved by the endless carrier along an endless trajectory, wherein the transfer devices are configured for simultaneously moving the gripping elements of both transfer devices, and the product engaged thereby, in a transfer direction along a transfer trajectory from the gripping location to the release location, wherein the transfer trajectory essentially forms part of the endless trajectory.

The aforementioned gripping element can advantageously be used in the above-described accumulator table, also known as buffer table, and especially in horizontally arranged accumulator tables, where the problem of the product being dragged along over the support surface may be particularly prevalent. The accumulator table can be provided with gripping elements with conventional (vertical) fins, e.g. if market conditions warrant so or the gripping element according to the invention is out of stock (this also applies to the accumulator table embodiments explained below), but product dragging will be more significant then.

A further embodiment thus relates to an accumulator table, comprising a storage conveyor, wherein the release location is situated on the storage conveyor.

Another embodiment relates to an aforementioned accumulator table, comprising multiple storage conveyors arranged parallel to each other, and two drive shafts for driving the storage conveyors, the first of the two drive shafts during use rotating at a first speed and the second of the two drive shafts during use rotating at a second speed, wherein the storage conveyors are each provided with a first coupling for coupling to the first shaft and a second coupling for coupling to the second shaft, such that each storage conveyor can be operated at a first speed as well as a second speed. This allows the accumulator table to be accurately configured for the required buffering speed or outfeed speed. The coupling may advantageously comprise a coupling in the form of an electromagnetic clutch.

Preferably, either the first coupling or the second coupling (or both) is provided with a protection device for protecting the coupling against leakage of the product situated on the storage conveyor. This prevents malfunctioning of the couplings and thus increases the mechanical reliability of the accumulator table.

Advantageously, the protection device may comprise a hygienic tape or belt. Such a tape or belt can be easily applied to the couplings and is relatively cheap, although in practice providing more than sufficient protection to the couplings against product spills, leakage, et cetera.

Another embodiment concerns an aforementioned accumulator table, wherein at least one of the endless carriers is driveable via a spline shaft, wherein the spline shaft extends in a direction perpendicular to a plane intersecting the endless trajectory of the respective endless carrier. The use of such a spline shaft for driving the endless carrier allows for the respective transfer device comprising the respective endless carrier to be detached easily from the spline shaft. Preferably, the transfer device can even be removed by hand, wherein the transfer device can be slid off the spline shaft. Preferably, the spline shaft is driven by a drive motor situated at the underside of the accumulator table allowing for a more compact accumulator table, as well as an accumulator table having decreased height (thus providing a better overview of the table). Furthermore, configuring one or more of the transfer devices to be easily exchangeable allows for transfer devices having a different geometry, especially a different outer, circumferential geometry to be installed relatively quickly. This feature is especially useful when products having a different width are to be processed. Preferably, in particular the inner transfer device or inner satellite, i.e. the transfer device at the inside of the transfer trajectory, is provided with such a quick change-out function. In the latter case, the outer satellite can remain in place, if required.

Another aspect of the invention relates to a conveyor system comprising an aforementioned accumulator table.

A further embodiment relates to an aforementioned conveyor system, wherein the infeed conveyor is provided with a separator device, upstream of the transfer arrangement, for increasing the spacing between consecutive products on the infeed conveyor, in such a way, that the increased spacing allows the transfer arrangement to move the release location of the product from a first storage conveyor of the accumulator table to a second storage conveyor of the accumulator table. Especially in accumulator tables having multiple parallel conveyors, the transfer arrangement may have to move frequently between the adjacent conveyors, especially when sudden buffering of products is required. By adjusting the spacing of the upstream supply of products using a separator device, the transfer arrangement is allowed enough time to move to another storage conveyor. The separator device may for instance comprise belts arranged at opposite sides of the infeed conveyor, wherein the belts are moving in a direction similar to the transport direction of the infeed conveyor, but at a lower speed, thereby engaging or rubbing against a passing product and thus slowing it down to increase product spacing. Preferably, the accumulator permanently runs in buffering mode, such that when buffering is required, a change can be initiated at the supply side of the table at all times. This allows downstream equipment to be placed relatively close to the table, saving space and allowing for increased flexibility with respect to the design of the conveyor system incorporating the accumulator table.

BRIEF DESCRIPTION OF THE DRAWINGS

A number of embodiments of an accumulator table and a gripping element according to the invention will be described in detail by way of non-limiting examples with reference to the accompanying drawings. In the drawings.

DETAILED DESCRIPTION OF THE INVENTION

Figure 1:
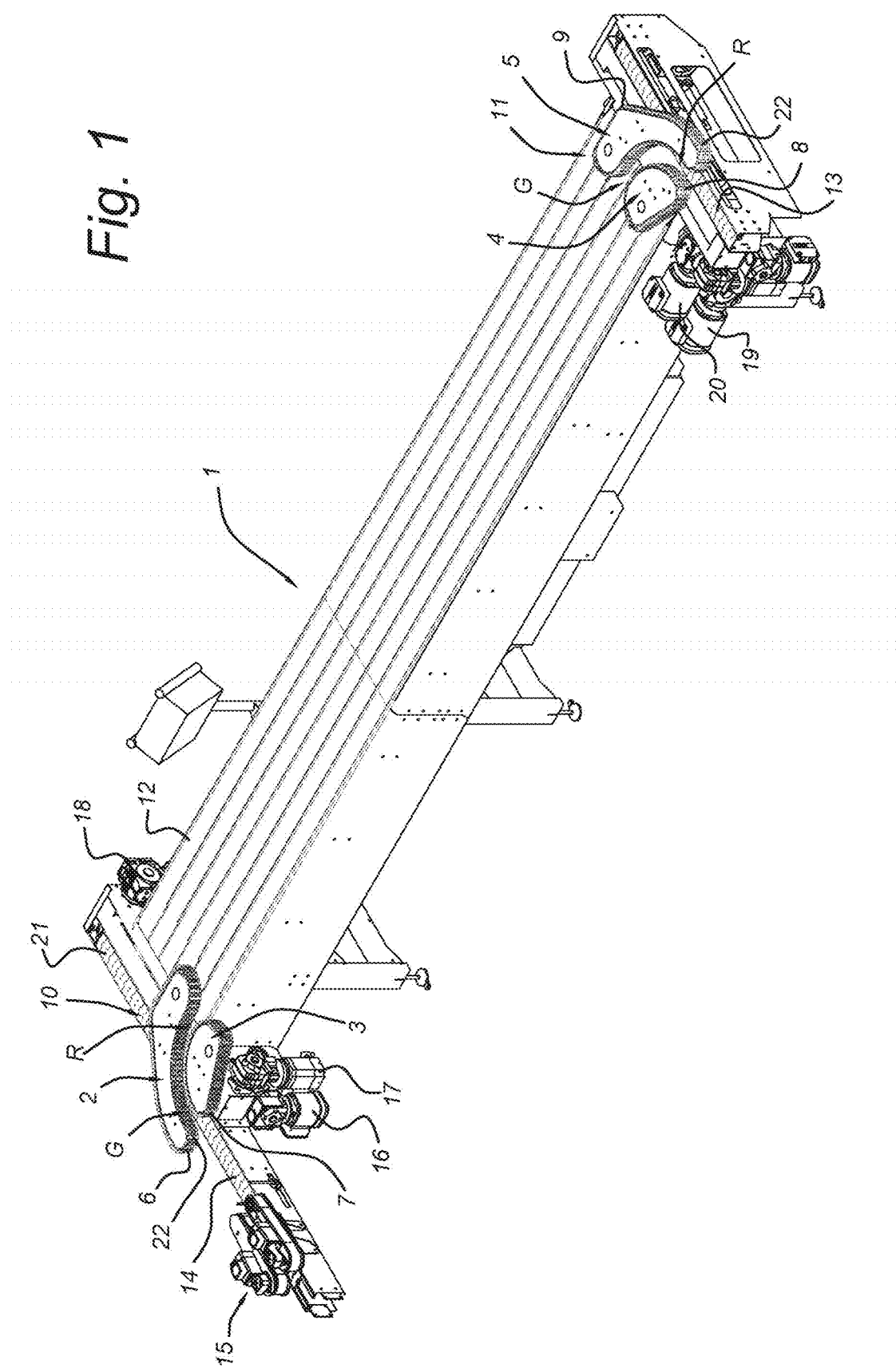
FIG. 1 shows a perspective view of an accumulator table provided with a gripper element according to the invention.

FIG. 1 shows a perspective view of an exemplary embodiment of an accumulator table 1 according to the invention, for use in a conveyor system. On the left side of FIG. 1, the accumulator table 1 comprises a first transfer arrangement 10 with a first transfer device 2 and a second, opposing transfer device 3, thereby forming a pair of opposing transfer devices 2, 3. On the right side of FIG. 1, the accumulator table 1 comprises a similar, second transfer arrangement 11 with a third transfer device 4 and a fourth, opposing transfer device 5, forming a pair of opposing transfer devices 4, 5. In principle, one of the transfer devices can alternatively comprise a non-driven guide rail or the like, but performance and transfer accuracy will decrease then. When seen from above, the first and fourth transfer devices 2, 5 have a C-like shape, whereas the second and third transfer devices 3, 4 have the shape of a semicircle. The C-like shape essentially opposes and matches the curved part of the semicircle such that a transfer trajectory with a substantially constant width is formed there between. The spacing between a pair of transfer devices can, however, be varied to allow for processing products with different product widths.

Both transfer arrangements 10, 11 are configured for engaging a product (not shown) at a gripping location G on an infeed conveyor and for releasing the product at a release location R, such as on an outfeed conveyor, using gripping elements 22 according to the invention. In the case of the left transfer arrangement 10 the infeed conveyor is formed by an inlet conveyor 21 and the outfeed conveyor is formed by one of multiple storage conveyors 12 of the accumulator table 1. In the case of the right transfer arrangement 11 the infeed conveyor is formed by one of multiple storage conveyors 12 of the accumulator table 1, whereas the outfeed conveyor is formed by an outlet conveyor 13. The width of a storage conveyor 12 may vary, depending on the product to be processed. The width may for instance lie in the range of 76-300 mm.

The transfer devices 2, 3, 4, 5 of FIG. 1 are each provided with an endless carrier 6, 7, 8, 9 suitable for composing a plurality of consecutive gripping elements 22 according to the invention. The endless carriers 6, 7, 8, 9 can be formed by a belt, chain or the like. The transfer device 2, 3, 4, 5 and thus the endless carriers 6, 7, 8, 9 are usually horizontally opposing. Preferably, a chain is used, since a chain allows the gripping elements 22 to be firmly connected thereto. Additionally, the gripping elements 22 are preferably detachably connected to the endless carrier and, more preferably, can be removed by hand if required. The transfer devices 2, 3, 4, 5 are furthermore configured to be movable near the ends of the storage conveyors 12, in a direction perpendicular thereto, such that, in the case of the left transfer arrangement 10, the desired storage conveyor 12 can be selected for releasing the product on and in the case of the right transfer arrangement 11, the desired storage conveyor 12 can be selected from which to discharge a product onto the outlet conveyor 13. Preferably, the transfer devices 2, 3, 4, 5 each comprise an automatic tensioning device, located inside, for tensioning the respective endless carrier 6, 7, 8, 9.

The endless carriers 6, 7, 8, 9 are to be driven by a drive system (not shown), in such a way, that when the drive system is activated the gripping elements 22 are moved by the endless carrier along an endless trajectory. The drive system of the left transfer arrangement 10 is driveably connected to the drive motors 16, 17 attached to the accumulator table 1. Each drive motor 16, 17 is configured to drive one of the transfer devices 2, 3. The right transfer arrangement 11 may utilize a similar arrangement. The drive system may comprise one or more drive shafts, sprocket wheels, gear wheels, et cetera, for connecting to the endless carriers 6, 7, 8, 9. Advantageously, such gear wheels are arranged near the curved parts of the endless carriers 6, 7, 8, 9, on the inside thereof, and directly engage the chain, belt, or the like, forming the endless carrier.

The transfer devices 2, 3, 4, 5 are configured for simultaneously moving the gripping elements 22 of both transfer devices, and the product engaged thereby, in a transfer direction along a curved transfer trajectory from the gripping location G to the release location R. The transfer trajectory essentially forms part of an endless trajectory, being the closed trajectory as defined by the trajectory of a gripping element 22 moving along the outer circumference of a transfer device from a first spatial location, again, to that first location. In the case of the left transfer arrangement 10, the gripping location G is situated on the inlet conveyor 21 and the release location R is situated on one of the storage conveyors 12. In the case of the right transfer arrangement 11, the gripping location G is situated on the storage conveyor 12 and the release location R is situated on the outlet conveyor 13.

The accumulator table 1 as shown in FIG. 1 comprises multiple storage conveyors 12 arranged parallel to each other. FIG. 1 shows six of such storage conveyors, although any another amount of conveyors 12 is conceivable, which amount for instance depends on the required buffer capacity of the accumulator table 1. In order to drive the storage conveyors 12 two drive shafts (not shown) are provided at the right end of the accumulator table 1. The drive shafts are driven, respectively, by a first drive motor 19 and a second drive motor 20. The first of the two drive shafts, during use, rotates at a first speed and the second of the two drive shafts during use rotates at a second speed. To achieve this, the storage conveyors 12 are each provided with a first coupling (not shown) for coupling to the first shaft and a second coupling for coupling to the second shaft, such that each storage conveyor can be operated at a first speed as well as a second speed. In order to protect the coupling against leakage of a product situated on the storage conveyor 12 the first coupling and/or the second coupling is provided with a protection device (not shown), such as a hygienic tape or belt that can be wound around the coupling or arranged over the coupling. By doing this, especially substances, such as fluids, leaking though the gaps between adjacent storage conveyors 12 can be prevented from damaging the respective coupling. Preferably, when using 12 storage conveyors or more, the drive shafts are supported by intermediate supports for preventing excessive downward bending of the drive shafts.

Some relevant aspects relating to the operation of the accumulator table 1 will be elucidated in the description following hereafter. Initial start-up of the accumulator table 1 is effected by a product detection sensor detecting a product passing by, such as package containing a beverage or a food product, the sensor preferably being arranged between the supply conveyor 14 and the inlet conveyor 21. By means of a software control program, the conveyor speed of the relevant inlet conveyor 21 and/or storage conveyors 12 can be adjusted, preferably it is adjusted in the range of 80%-120% of the maximum speed of the inlet conveyor 21 and/or the storage conveyors 12. When the product detection sensor no longer detects products, operation will be halted. Preferably, this takes place in cooperation with a separator product sensor, arranged just downstream of the separator device 15, the separator product sensor being configured for halting the separator device 15 when no more products are detected. Advantageously, to allow product tracing, each individual product is marked by a pulse originating from a pulse device arranged on, for instance, the inlet conveyor 21.

The separator product sensor preferably is embodied to count the products to supply to the inlet conveyor 21. In the case the desired amount of products to be supplied is not yet reached, hut the storage conveyors 12 have been filled to their maximum buffering capacity, the separator device 15 will be halted anyway.

When one of the storage conveyors 12 is filled with products, in principle, the accumulator table 1 can start discharging these products. Again, the conveyor speed of the storage conveyors 12 is preferably adjusted in the range of 80%-120% of the maximum speed of the storage conveyors 12.

Figures 2, 2A:
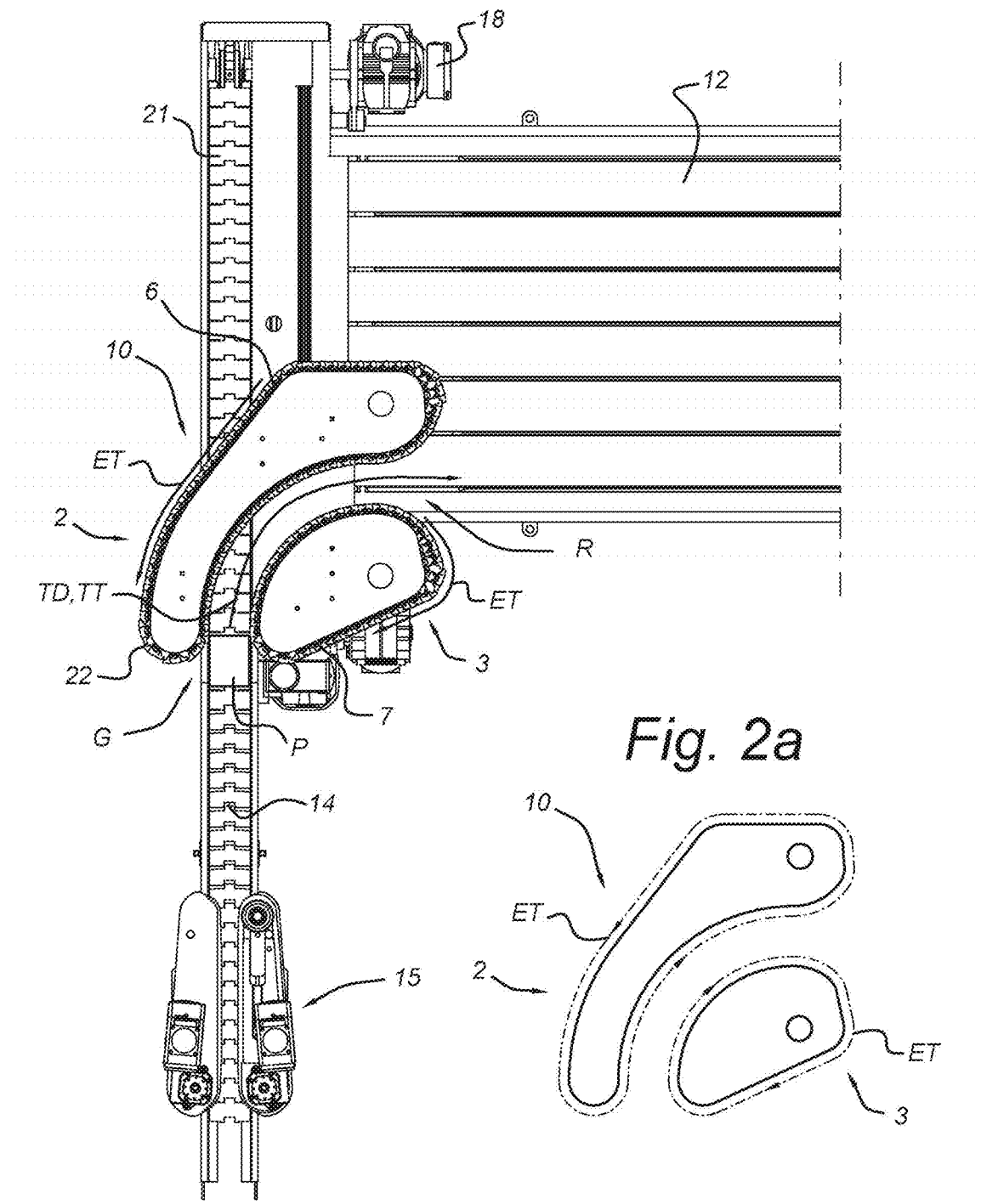
FIG. 2 shows a top view of a pair of transfer devices of a transfer arrangement of the accumulator table of FIG. 1.
FIG. 2a shows a close-up view of the endless trajectories of the first and second transfer devices of FIG. 2.

FIG. 2 shows a top view of the pair of transfer devices 2, 3 of the left transfer arrangement 10 of the accumulator table of FIG. 1. FIG. 2 more clearly shows the transfer direction TD to be followed by a product P being transferred from the gripping location G to the release location R. Additionally, the corresponding transfer trajectory is indicated by the letters TT. Analogously, the endless trajectories ET of the gripping elements on the endless carriers 6, 7 are indicated.

FIG. 2a more clearly shows a close-up view of the endless trajectories ET of the first and second transfer devices of FIG. 2.

Figure 3:
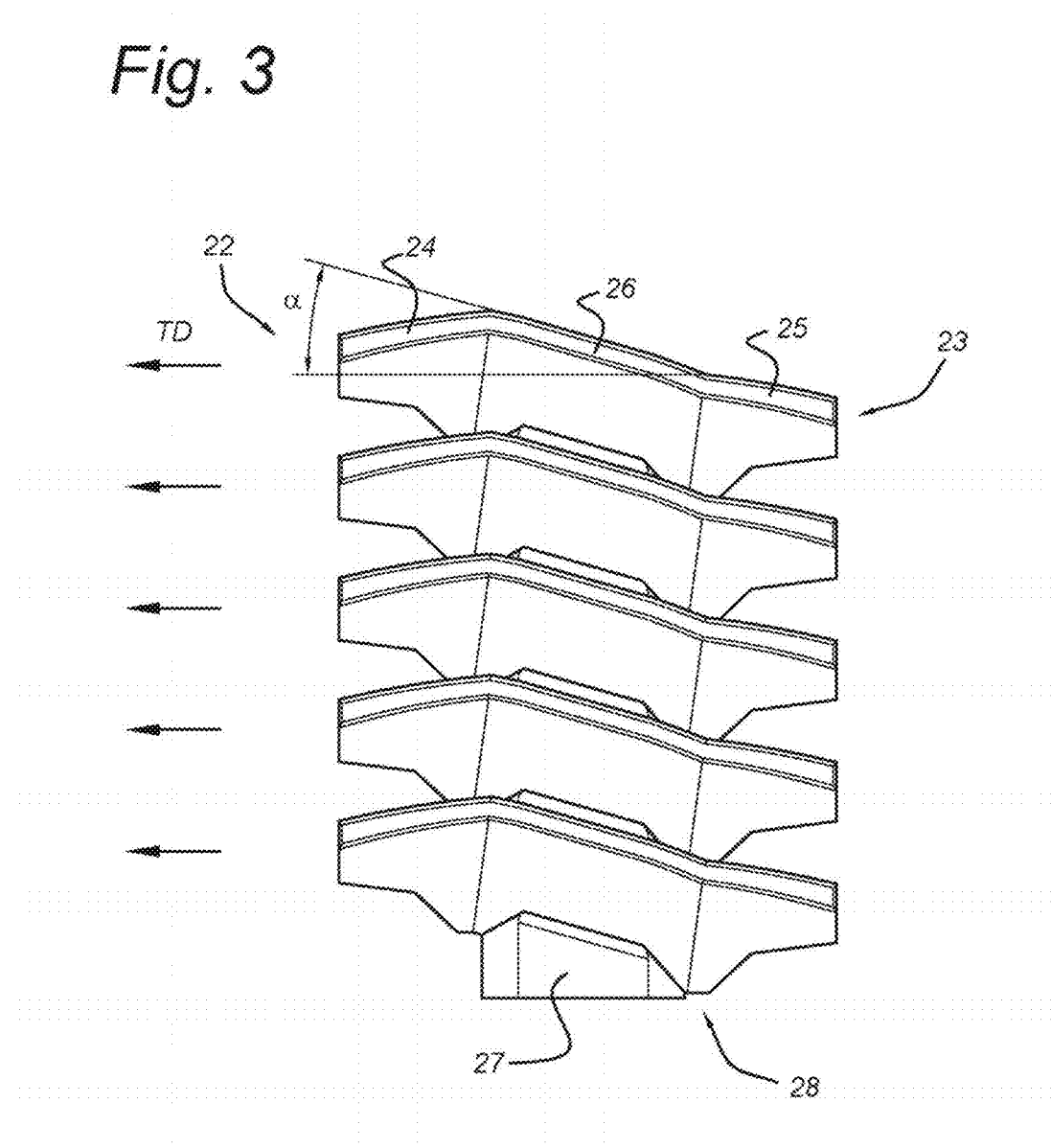
FIG. 3 shows a side view of an exemplary embodiment of a gripper element according to the invention.

FIG. 3 shows a side view of an exemplary embodiment of a gripper element 22 according to the invention. FIG. 3 shows a vertical row 28 of five flexible fins 23 for engaging the product and moving it in the transfer direction TD, as indicated by several arrows. Each flexible fin 23 comprises a front section 24 and a back section 25, between which a sloped section 26 is arranged, at an angle α with respect to the transfer direction TD, connecting the front section 24 and back section 25. The transfer direction TD may for instance be substantially horizontal in the case of a horizontal accumulator table 1. The flexible fins 23 are arranged on a base element 27, which, during use, is to be attached to the respective endless carrier.

Thus, the invention has been described by reference to the embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention.

REFERENCE NUMERALS

1. Accumulator table
2. First transfer device
3. Second transfer device
4. Third transfer device
5. Fourth transfer device
6. Endless carrier of first transfer device
7. Endless carrier of second transfer device
8. Endless carrier of third transfer device
9. Endless carrier of fourth transfer device
10. First transfer arrangement
11. Second transfer arrangement
12. Storage conveyor
13. Outlet conveyor
14. Supply conveyor
15. Separator device
16. Drive motor for first transfer device
17. Drive motor for second transfer device
18. Drive motor for inlet conveyor
19. First drive motor for storage conveyors
20. Second drive motor for storage conveyors
21. Inlet conveyor
22. Gripping element
23. Flexible fin
24. Front section of flexible fin
25. Back section of flexible fin
26. Sloped section of flexible fin
27. Base part of gripping element
28. Row of flexible fins

The invention claimed is:

1. A gripping element, suitable for use in a transfer arrangement of an accumulator table, the transfer arrangement comprising a pair of opposing transfer devices for engaging a product at a gripping location on an infeed conveyor for the transfer devices and for releasing the product at a release location, such as on an outfeed conveyor,
wherein the infeed conveyor is positioned in such a way as to deliver the product to the transfer devices of the accumulator table, wherein the transfer devices are suitable for being provided with an endless carrier comprising a plurality of gripping elements,
wherein the endless carrier is to be driven by a drive system, in such a way, that when the drive system is activated the gripping elements are moved by the endless carrier along an endless trajectory,
wherein the transfer devices are configured for simultaneously moving the gripping elements of both transfer devices, and the product engaged thereby, in a transfer direction along a transfer trajectory from the gripping location to the release location, wherein the transfer trajectory essentially forms part of the endless trajectory,
characterized by
a flexible fin for engaging the product, during use substantially extending in a plane aligned with the transfer direction, the plane intersecting the transfer direction,
the flexible fin having such a shape that, at the gripping location, when, at that gripping location, the transfer direction is substantially parallel to a product support surface of the infeed conveyor, the product is lifted from the support surface, wherein the flexible fin comprises a sloped section that extends at an upward angle with respect to the transfer direction causing the product to be lifted from the support surface.

2. The gripping element of claim 1, wherein the flexible fin comprises a front section, when seen in the transfer direction, substantially aligned with the transfer direction, and a back section, substantially aligned with the front section, wherein the sloped section is situated between the front and back sections, connecting them to each other.

3. The gripping element of claim 1, comprising a row of flexible fins, the row extending in a direction perpendicular to the transfer direction, the flexible fins extending substantially parallel to each other.

4. An assembly of gripping elements of claim 1, wherein multiple gripping elements are arranged consecutively, with respect to the transfer direction, on the endless carrier, the flexible fins of adjacent gripping elements overlapping at all points on the endless trajectory.

5. An accumulator table for use in a conveyor system, comprising a transfer arrangement with a pair of opposing transfer devices for engaging a product at a gripping location on an infeed conveyor for the transfer devices and for releasing the product at a release location, such as on an outfeed conveyor, wherein the infeed conveyor is positioned in such a way as to deliver the product to the transfer devices, wherein the transfer devices are provided with an endless carrier comprising a plurality of consecutive gripping elements of claim 1, wherein the endless carrier is to be driven by a drive system, in such a way, that when the drive system is activated the gripping elements are moved by the endless carrier along an endless trajectory, wherein the transfer devices are configured for simultaneously moving the gripping elements of both transfer devices, and the product engaged thereby, in a transfer direction along a transfer trajectory from the gripping location to the release location, wherein the transfer trajectory essentially forms part of the endless trajectory.

6. The accumulator table of claim 5, comprising a storage conveyor, wherein the release location is situated on the storage conveyor.

7. The accumulator table of claim 6, comprising multiple storage conveyors arranged parallel to each other, and two drive shafts for driving the storage conveyors, the first of the two drive shafts during use rotating at a first speed and the second of the two drive shafts during use rotating at a second speed, wherein the storage conveyors are each provided with a first coupling for coupling to the first shaft and a second coupling for coupling to the second shaft, such that each storage conveyor can be operated at a first speed as well as a second speed.

8. The accumulator table of claim 7, wherein the first coupling or the second coupling is provided with a protection device for protecting the coupling against leakage of the product situated on the storage conveyor.

9. The accumulator table of claim 8, wherein the protection device comprises a hygienic tape or belt.

10. The accumulator table of claim 5, wherein at least one of the endless carriers is driveable via a spline shaft, wherein the spline shaft extends in a direction perpendicular to a plane intersecting the endless trajectory of the respective endless carrier.

11. A conveyor system comprising the accumulator table of claim 5.

12. Conveyor system of claim 11, wherein the infeed conveyor is provided with a separator device, upstream of the transfer arrangement, for increasing the spacing between consecutive products on the infeed conveyor, in such a way, that the increased spacing allows the transfer arrangement to move the release location of the product from a first storage conveyor of the accumulator table to a second storage conveyor of the accumulator table.

13. An accumulator table for use in a conveyor system, comprising a transfer arrangement with a pair of opposing transfer devices for engaging a product at a gripping location on an infeed conveyor for the transfer devices and for releasing the product at a release location, such as on an outfeed conveyor, wherein the infeed conveyor is positioned in such a way as to deliver the product to the transfer devices, wherein the transfer devices are provided with an endless carrier comprising an assembly of gripping elements of claim 4, wherein the endless carrier is to be driven by a drive system, in such a way, that when the drive system is activated the gripping elements are moved by the endless carrier along an endless trajectory, wherein the transfer devices are configured for simultaneously moving the gripping elements of both transfer devices, and the product engaged thereby, in a transfer direction along a transfer trajectory from the gripping location to the release location, wherein the transfer trajectory essentially forms part of the endless trajectory.

* * * * *